(12) United States Patent
White et al.

(10) Patent No.: US 6,214,210 B1
(45) Date of Patent: Apr. 10, 2001

(54) ELECTROCHEMICAL SURFACE ANALYSIS USING DEOXYGENATED GEL ELECTROLYTE

(75) Inventors: John T. White, Lancaster; D. Morgan Tench, Ventura, both of CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 08/336,353

(22) Filed: Nov. 8, 1994

(51) Int. Cl.$^7$ ...................................................... G01N 27/26
(52) U.S. Cl. ....................... 205/790.5; 204/414; 204/434; 205/775
(58) Field of Search ................................ 204/153.1, 414, 204/434; 205/490.5, 791, 791.5

(56) References Cited

U.S. PATENT DOCUMENTS

| | | | |
|---|---|---|---|
| 3,272,725 | * | 9/1966 | Garst . |
| 3,380,905 | * | 4/1968 | Clark . |
| 3,530,045 | * | 9/1970 | Alburger . |
| 4,024,036 | * | 5/1977 | Nakamura et al. . |
| 4,190,501 | * | 2/1980 | Riggs . |
| 4,197,176 | * | 4/1980 | Ensanian . |
| 4,439,303 | * | 3/1984 | Cocchi . |
| 4,455,212 | * | 6/1984 | Baxter . |
| 4,836,908 | * | 6/1989 | Ford . |
| 5,104,494 | * | 4/1992 | Tench et al. . |
| 5,262,022 | * | 11/1993 | Tench et al. . |

OTHER PUBLICATIONS

Roberts et al, "Basic Principles of Organic Chemistry", 1965, p. 638.*
Florence et al., "Removal of Oxygen from Polarographic Solutions with Ascorbic Acid", *Electroanalytical Chemistry and Interfacial Electrochemistry*, vol. 41, pp. 127–133 (1973).

* cited by examiner

*Primary Examiner*—T. Tung
(74) *Attorney, Agent, or Firm*—James P. O'Shaughnessey; John J. Deinken

(57) ABSTRACT

Electrochemical surface analysis using a deoxygenated gel electrolyte provides advantages over a liquid electrolyte in processes such as sequential electrochemical reduction analysis. In sequential electrochemical reduction analysis, a solderable portion of an electronic component or circuit board to be tested is placed in contact with a deoxygenated gel electrolyte such as a borate buffer solution having a gelling agent. The gel electrolyte prevents capillary attraction up or along a lead of the component so that the power source cathode lead does not contact the electrolyte and electrochemical analysis can be localized to the area of interest, such as the portion of the component lead to be soldered. Interfering effects of atmospheric oxygen are minimized for deaerated gel electrolytes because convection mixing is practically absent and diffusion is generally a very slow process in a gel. For a gel electrolyte saturated with inert gas and including an oxygen scavenger, brief exposure to oxygen as test specimens are changed does not affect the electrochemical analysis. In some cases, it is be possible to perform electrochemical analysis in ambient atmosphere rather than in an inert gas as generally required by the prior art.

20 Claims, 2 Drawing Sheets

ELECTROCHEMICAL SURFACE ANALYSIS USING DEOXYGENATED GEL ELECTROLYTE

TECHNICAL FIELD

The present invention relates to methods of electrochemical analysis and, in particular, to the use of gel electrolytes for electrochemical analysis of metal or semiconductor surface characteristics.

BACKGROUND OF THE INVENTION

A major cost problem experienced by the electronics industry is the loss of solderability of electronic components, particularly during storage. Poor solderability of electronic component leads and printed wiring boards accounts for a large percentage of solder joint failures. Previous studies have determined that oxidation of the surface and underlying substrate and/or intermetallic layers of solderable components is a cause of this degradation. Solderability and the basic methods of sequential electrochemical reduction analysis and restoration of solderability are described in U.S. Pat. Nos. 5,262,022 and 5,104,494, the teachings of which are hereby incorporated by reference.

In the method of sequential electrochemical reduction analysis, surface oxides that interfere with the solderability of metals are detected by electrochemical reduction. The resulting data yields both the types and amounts of oxides present. For analysis of printed wiring board (PWB) through-holes and surface pads, an electrolytic solution is brought into contact with the area to be tested and electrical contact is made through another PWB feature that is electrically interconnected with the test area. Large component leads, such as resistor wires, can be evaluated conveniently by immersing the portion to be tested in the electrolyte solution and making electrical contact to a part of the lead above the level of the solution. However, testing of fine-pitched component leads is difficult because electrolyte solution tends to extend up the lead to the component body by capillary attraction. Because little or no unwetted area remains on the component lead, the cathode connecting lead generally comes into contact with the electrolyte solution. Thus, the cathode lead must have a high hydrogen overvoltage (i.e., the same as or higher than that of the tested component) and must be pre-reduced to avoid measurement errors from its reaction with the electrolyte. Also, the upper part of the component lead, where capillary attraction or "wicking" occurs, is usually not typical of the area to be soldered and can give misleading results when included as part of the analyzed area. Furthermore, penetration of electrolyte solution into non-hermetic seals between leads and the component body can result in damage to the device and grossly erroneous data from electrochemical analysis.

Another problem with many electrochemical analytical methods, including sequential electrochemical reduction analysis, is interference from oxygen that is present initially or is introduced through leaks in the electrolyte solution containment system. Electric current associated with electrochemical reduction of oxygen tends to mask the processes of interest and introduce errors into the analysis data. Thus, there is a need for an improved, quantitative, nondestructive method of analysis that is easily adapted for electrochemical testing of various electronic and corrosion resistant components.

SUMMARY OF INVENTION

The present invention comprises a method and apparatus for electrochemical analysis of metal or semiconductor surfaces using a deoxygenated gel electrolyte. Use of a gel electrolyte is applicable to known processes, such as sequential electrochemical reduction analysis for determining solderability of electronic components which is described in U.S. Pat. No. 5,262,022, and electrochemical surface analysis of metallic corrosion resistant materials, for example. In sequential electrochemical reduction analysis, performed according to the method of the present invention, a solderable portion of an electronic component or circuit board to be tested is placed in contact with a gel electrolyte, such as a deoxygenated borate buffer solution having a gelling agent. The solderable portion of the component is connected to the cathode of a direct current power source. A second, counter electrode, typically comprising an inert material such as platinum or stainless steel, for example, and a third, reference electrode, such as a saturated calomel electrode (SCE), are also placed in contact with the gel electrolyte. A small current is passed between the counter electrode and the solderable portion of the component in contact with the gel electrolyte while the potential between the cathode and the reference electrode is recorded as a function of time to analyze the solderable portion of the component for surface oxides. In systems where the counter electrode has a stable voltage at the low currents used, it can also function as the reference electrode, thereby eliminating the need for a separate reference electrode.

Use of a deoxygenated gel electrolyte provides several advantages over a conventional liquid electrolyte in processes such as sequential electrochemical reduction analysis. Compared to a liquid electrolyte solution, a gel electrolyte prevents capillary attraction or "wicking" up and/or along an electrical component lead. Prevention of wicking allows electrochemical analysis to be localized to the area of interest, such as the portion of the lead to be soldered, and keeps the electrolyte from coming into contact with the cathode lead from the power source. Also, the interfering effects of atmospheric oxygen are minimized for deoxygenated (or deaerated) gel electrolytes because convection mixing of atmospheric oxygen is practically absent and diffusion is generally a very slow process in a gel. For a gel electrolyte saturated with inert gas, for example, brief exposure to oxygen as test specimens are changed is not sufficient to affect the electrochemical analysis. In some cases, it is possible to perform the electrochemical analysis in ambient atmosphere rather than in an inert gas atmosphere as is generally required in the prior art.

A principal object of the invention is improved electrochemical analysis of metal or semiconductor surfaces. A feature of the invention is the use of a deoxygenated gel electrolyte in electroanalytical methods such as sequential electrochemical reduction analysis to determine solderability of electronic components. An advantage of the invention is electrochemical analysis of metal or semiconductor surfaces where the presence of oxygen introduces errors into the analysis and where capillary attraction of liquid electrolytes is undesirable.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a method and apparatus for electrochemical analysis using a deoxygenated gel electrolyte. Use of a gel electrolyte is applicable to known processes, such as sequential electrochemical reduction analysis for determining solderability of electronic components and electrochemical AC impedance measurements for nondestructive assessment of corrosion resistance of metallic coatings and bulk materials, for example. The following description is directed to sequential electrochemical reduction analysis as an exemplary embodiment (but not a limitation) of the invention.

Figure 1:
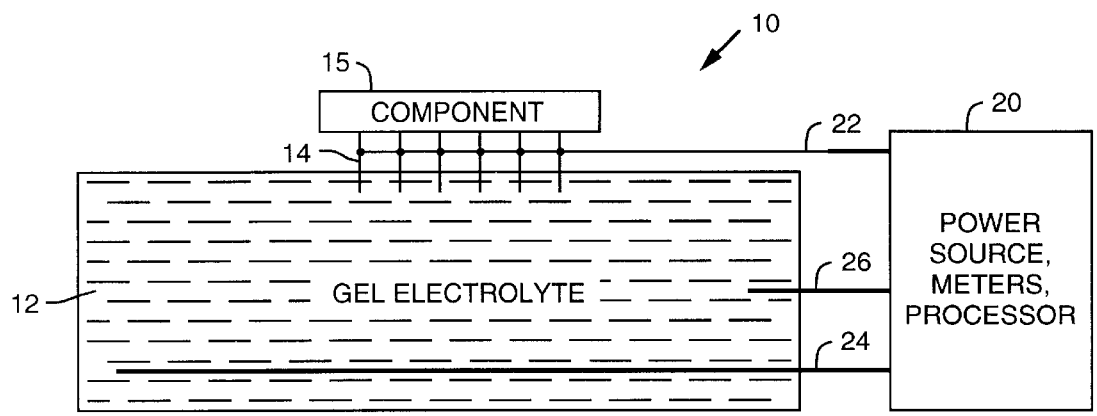
FIG. 1 is a schematic diagram of an apparatus for electrochemical analysis of connecting leads of an electronic component using a gel electrolyte.

FIG. 1 is a schematic illustration of a basic apparatus 10 using a deoxygenated gel electrolyte 12 for sequential electrochemical reduction analysis of connector leads 14 of an electronic component 15, which may comprise a dual in-line package (DIP), for example. In the general case, any metal or semiconductor surface to be analyzed may take the place of leads 14. Electrochemical analysis of leads 14 is driven by an electrical power source 20, which may include meters for measuring voltage and current and a processor for analyzing, displaying, and printing voltage, current, and charge density data. Power source 20 may comprise an AC or DC source depending on the type of electrochemical analysis to be performed. A first electrode 22 connects the component lead or leads 14 to be tested to power source 20 (leads 14 may be connected separately or together for analysis). A second electrode 24 is placed in contact with gel electrolyte 12. When leads 14 are placed in contact with gel electrolyte 12, a current from power source 20 flows between leads 14 and electrode 24 through gel electrolyte 12. Electrochemical analysis is performed by measuring voltage and current during the process. If necessary, a third, reference electrode 26 (SCE, for example) may be placed in contact with gel electrolyte 12 to obtain accurate voltage measurements. This basic process, using an electrolyte solution rather than a gel, is described in U.S. Pat. No. 5,262,022, the teachings of which are incorporated herein by reference.

In exemplary apparatus 10, power source 20 provides direct current between anode 24 and cathode 22 to reduce oxides on the surfaces of leads 14. Current is passed between anode 24, which typically comprises an inert material such as stainless steel or platinum, for example, and the portions of leads 14 that are in contact with gel electrolyte 12. In this example, the potential of cathode 22 is measured relative to reference electrode 26, which may comprise a saturated calomel electrode, for example, that is also in electrical contact with gel electrolyte 12.

Use of gel electrolyte 12 provides several advantages over a conventional liquid electrolyte in electrochemical analysis. Compared to a liquid electrolyte solution, gel electrolyte 12 prevents capillary attraction or "wicking" of the electrolyte up and/or along an electrical component lead 14. As a result, electrochemical analysis can be localized to the area of interest, such as the portion of the component lead 14 to be soldered. In the prior art, capillary attraction can cause the electrolyte to come into contact with cathode lead 22 from power source 20, which can result in erroneous voltage/current measurements and inaccurate data. Capillary attraction of the electrolyte up leads 14 can also cause the electrolyte to damage component 15 if it is not sealed or otherwise resistant to the chemical effects of the electrolyte.

Also unlike liquids, gel electrolyte 12 may be effectively maintained in a deoxygenated condition. Deoxygenated (or deaerated) gel electrolyte 12 reduces the interfering effects of atmospheric oxygen because convection mixing of atmospheric oxygen is practically absent in a gel and diffusion of oxygen in a gel is a very slow process. The detrimental effects of oxygen can be further reduced by including an oxygen scavenger or getter, such as ascorbic acid or ascorbate ion (approximately 0.2–1.0 M, for example) in gel electrolyte 12. For a gel electrolyte 12 saturated with inert gas and possibly including an oxygen scavenger, for example, brief exposure to oxygen as test specimens 15 are changed is not sufficient to affect the electrochemical analysis. In some cases, therefore, it is possible to perform the electrochemical analysis using gel electrolyte 12 in an ambient atmosphere rather than in an atmosphere of inert gas as is generally required by the prior art.

Figure 2:
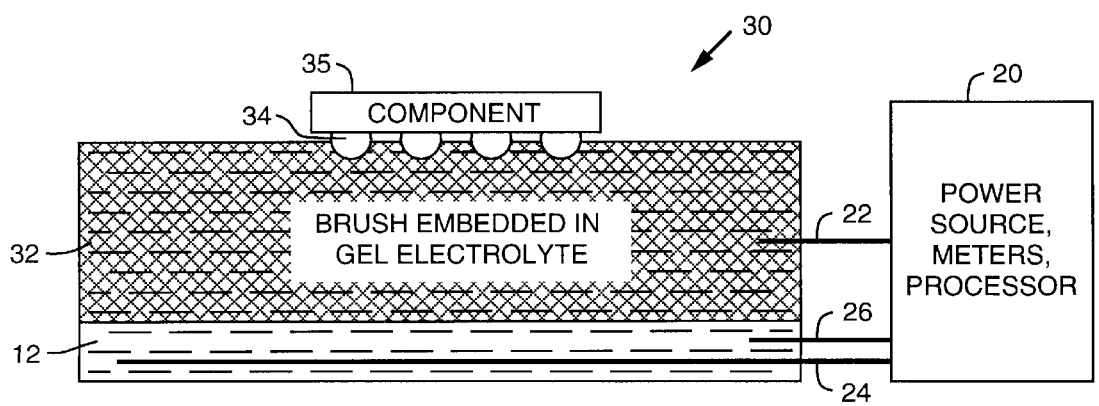
FIG. 2 is a schematic diagram of an apparatus for electrochemical analysis of solder ball connectors of an electronic component using a gel electrolyte having an embedded mesh of pre-reduced cathode leads.

FIG. 2 is a schematic illustration of an apparatus 30 modified for electrochemical analysis of very short component leads or other surfaces, such as solder ball leads 34 in a ball grid array (BGA) on electronic component 35, for example, that are not easily connectable directly to power source 20. In apparatus 30, a brush 32 comprising a mesh, wool, particle bed, or web of electrically conductive, pre-reduced contact leads is embedded in deoxygenated gel electrolyte 12. The contact leads of brush 32 are pre-reduced to remove oxides that would otherwise cause erroneous voltage/current measurements when analyzing component 35. Brush 32 also comprises a material having a high hydrogen overvoltage (i.e., equal to or higher than that of the component leads 34 being tested) to minimize evolution of hydrogen gas from gel electrolyte 12 and to extend the analysis to more negative potentials. As illustrated in FIG. 2, brush 32 typically comprises fine wires or particles that are sufficiently numerous to ensure electrical contact with surfaces 34 that are to be analyzed. Embedded wire brush 32 thus can be used to facilitate analysis of component surfaces having various geometries.

In addition to the examples described above, a soft gel or very viscous liquid electrolyte may provide significant advantages for sequential electrochemical reduction analysis of surface pads on printed wiring boards. Air leaks are sometimes a problem in testing surface pads using conventional electrolytes because of the difficulty in forming a good liquid seal to irregular surfaces. A viscous liquid or soft gel electrolyte will form a seal much more readily. For testing surface pads, a soft gel electrolyte could be dispensed from a plunger-cylinder arrangement similar to that used to dispense solder pastes, thus eliminating the need for an o-ring seal around the pad. During the voltage/current measurements, contact could be maintained between the dispensed portion of gel and a gel reservoir, which would contain the counter and reference electrodes in contact with the gel electrolyte.

Preparation of Gel Electrolytes

Gel electrolytes may be prepared by adding gelling agents such as gelatin or agar, for example, to a heated electrolyte solution, which then gels upon cooling. Deoxygenated gels may be prepared by bubbling inert gas through an electrolyte solution and maintaining the electrolyte in an inert atmosphere during the gelling process. Alternative methods of preparing a deoxygenated gel include boiling an electrolyte solution or applying a vacuum to remove oxygen, and then gelling quickly or in an inert atmosphere. In a slow process, a gelled electrolyte can simply be allowed to reach equilibration in an atmosphere of inert gas. Gel firmness, rigidity, and viscosity can be adjusted simply by adding more or less of the gelling agent to the electrolyte. Gels are also reversible in that heating a gel returns it to an aqueous state and subsequent cooling reforms the gel.

Firmness of the gel electrolyte may be optimized for a particular application. A relatively firm gel is preferred for electronic components with fine-pitch surface-mount leads, for example, so that the analyzed area can be restricted to the bottom part of the lead, which is the area to be soldered. A softer gel is preferred for printed wiring board through-holes to ensure good contact of the electrolyte around the circumference of the hole. For soft gels of appropriate consistency, the electrolyte does not adhere to the tested part when it is removed from the gel. Sufficiently soft gels also "heal" (i.e., return to their original shape, form, consistency, etc.) after being punctured by a tested component lead so that the same gel can be used to analyze many successive components.

Summary of Experimental Results

The efficacy of gel electrolytes for electrochemical surface analysis was tested using identical copper wires (0.65 mm diameter) coated with fused eutectic tin-lead. Sequential electrochemical reduction analysis was performed on the specimens using various gels. Deoxygenated electrolyte gels were prepared by bubbling nitrogen through a pH 8.4 borate buffer electrolyte as it was heated to 60–70° C. inside a nitrogen atmosphere glove box, dissolving the gelling agent in the solution, and allowing the solution to cool slowly to room temperature. Good results were obtained with gelatin as the gelling agent. Preliminary studies indicated that other gels, such as agar, bacto-agar, cetyltriammonium tosylate, polyacrylamide, and carboxylmethyl cellulose, for example, can also be used for preparing the gel electrolyte.

Sequential electrochemical reduction data obtained using a deoxygenated gel electrolyte inside an inert atmosphere glove box were equivalent to those obtained for a deaerated borate buffer solution without a gelling agent added. The tin oxide plateau voltage, which is a key parameter, was nearly identical for the two electrolytes.

Figure 3:
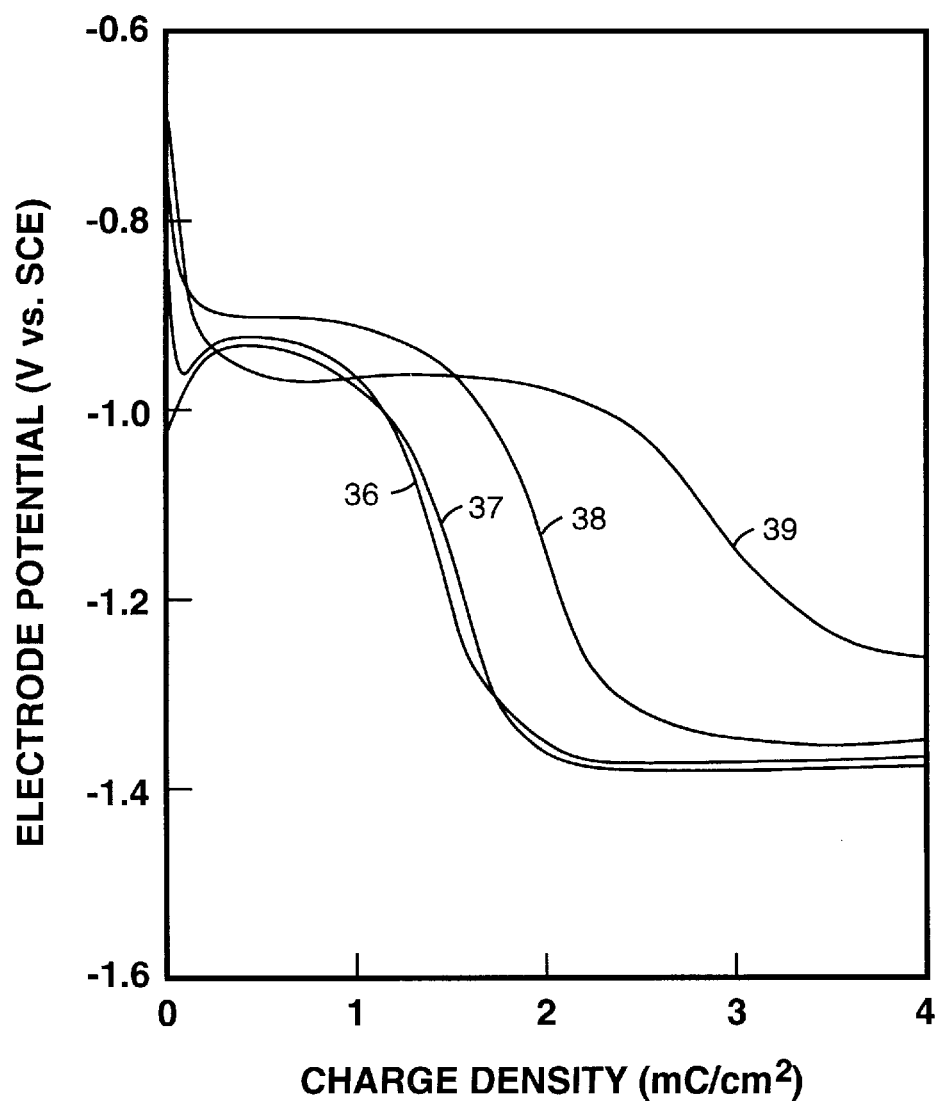
FIG. 3 is a comparative plot of electrode potential versus charge density for sequential electrochemical reduction analysis of tin-lead coated wires obtained using the method of the present invention in ambient air and in a nitrogen atmosphere.

Experiments were also performed to test the sensitivity of deoxygenated gel electrolytes to ambient oxygen. In a variation, ascorbic acid was added to the deoxygenated gel to function as an oxygen scavenger or getter. FIG. 3 shows data curves obtained from sequential electrochemical reduction analysis of tin-lead coated wires placed in contact with deaerated pH 8.4 borate buffer gel electrolyte (7.5% gelatin), with and without 0.2 M ascorbic acid added. Under an atmosphere of nitrogen, the data obtained using deoxygenated gel electrolytes with and without ascorbic acid, as shown by curves 36 and 37, respectively, were nearly identical and very reproducible. For measurements made in ambient air without ascorbic acid in the gel electrolyte, as shown by curve 39, the data were less reproducible but the overall curve shapes and plateau voltages were comparable, even though the effects of oxygen were evident (e.g., longer plateaus). This result is in sharp contrast to sequential electrochemical reduction analysis data obtained using prior art aqueous electrolyte solutions in ambient atmosphere, which exhibit grossly ill-defined plateau, positive voltage shifts, and fluctuations with time that make the data unusable. With ascorbic acid added to a gel electrolyte, sequential electrochemical reduction analysis data obtained in ambient air, as shown by curve 38, were very close to those obtained under nitrogen. Thus, deoxygenated gel electrolytes, particularly those with an added oxygen getter such as ascorbic acid or ascorbate ion, greatly reduce the sensitivity of sequential electrochemical reduction analysis to the effects of oxygen. In less sensitive applications, therefore, deoxygenated gel electrolytes, especially those with an added oxygen scavenger or getter, may be used effectively in ambient air to perform electrochemical surface analyses.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A method of electrochemical analysis for quantifying oxides on a surface, comprising the steps of:

connecting a source of electric power to first and second electrodes;

connecting said first electrode to said surface;

providing an electrolyte in the form of a deoxygenated gel;

placing said surface in contact with said deoxygenated gel electrolyte;

placing said second electrode in contact with said deoxygenated gel electrolyte;

passing a current between said first and second electrodes for reducing the oxides on said surface in contact with said deoxygenated gel electrolyte; and measuring voltage and current in said electrodes as a function of time for quantifying the oxides on said surface in contact with said deoxygenated gel electrolyte.

2. The method of claim 1, wherein the step of providing said deoxygenated gel electrolyte includes the step of adding a gelling agent to a deoxygenated electrolyte solution.

3. The method of claim 2, wherein the step of adding a gelling agent to said deoxygenated electrolyte solution includes the step of selecting a gelling agent from the group of materials consisting of gelatin, agar, bacto-agar, cetyltriammonium tosylate, polyacrylamide, and carboxylmethyl cellulose.

4. The method of claim 1, wherein the step of providing said deoxygenated gel electrolyte includes the step of including an oxygen getter in said deoxygenated gel electrolyte.

5. The method of claim 1, further comprising the step of placing a third reference electrode in contact with said deoxygenated gel electrolyte.

6. The method of claim 1, wherein the step of connecting said first electrode to said surface further comprises embedding a brush of electrically conductive material in said deoxygenated gel electrolyte, connecting said first electrode to said brush, and placing said surface in said gel electrolyte and in contact with said brush.

7. A method of electrochemically analyzing a metal or semiconductor surface to identify and quantify surface oxides, comprising the steps of:

connecting a source of electric power to first and second electrodes;

connecting said first electrode to said surface;

forming a deoxygenated gel electrolyte by adding a gelling agent to a deoxygenated electrolyte solution;

placing said surface in contact with said deoxygenated gel electrolyte;

placing said second electrode in contact with said deoxygenated gel electrolyte;

placing a third reference electrode in contact with said deoxygenated gel electrolyte;

passing a current between said first and second electrodes for reducing the oxides on said surface in contact with said deoxygenated gel electrolyte; and measuring voltage between said first and third electrodes and current between said first and second electrodes as a function of time for identifying and quantifying the oxides on said surface in contact with said deoxygenated gel electrolyte.

8. The method of claim 7, wherein the step of adding a gelling agent to said deoxygenated electrolyte solution includes the step of selecting a gelling agent from the group of materials consisting of gelatin, agar, bacto-agar, cetyltriammonium tosylate, polyacrylamide, and carboxylmethyl cellulose.

9. The method of claim 7, wherein the step of providing said deoxygenated gel electrolyte includes the step of including an oxygen getter in said deoxygenated gel electrolyte.

10. The method of claim 9, wherein the step of including said oxygen getter in said deoxygenated gel electrolyte comprises adding ascorbic acid or ascorbate ion to said deoxygenated gel electrolyte.

11. The method of claim 7, wherein the step of connecting said first electrode to said surface further comprises embedding a brush of electrically conductive material in said deoxygenated gel electrolyte, connecting said first electrode to said brush, and placing said surface in said gel electrolyte and in contact with said brush.

12. The method of claim 7, further comprising the step of reforming said deoxygenated gel electrolyte after analyzing said surface by heating then cooling said deoxygenated gel electrolyte.

13. A method of sequential electrochemical reduction analysis for determining solderability of a solderable metal connector of an electronic component, comprising the steps of:

providing a source of direct current electric power having an anode and a cathode;

providing an electrolyte in the form of a deoxygenated gel;

placing the solderable metal connector in contact with said deoxygenated gel electrolyte;

connecting said cathode to the solderable metal connector;

placing said anode in contact with said deoxygenated gel electrolyte;

passing a current between said anode and cathode for reducing oxides on the solderable metal connector in contact with said deoxygenated gel electrolyte; and measuring voltage and current in said anode and cathode as a function of time for electrochemically identifying and quantifying said oxides for determining solderability of the metal connector.

14. The method of claim 13, further comprising the step of placing a reference electrode in contact with said deoxygenated gel electrolyte for measuring voltage between said reference electrode and said cathode.

15. The method of claim 13, wherein the step of providing said deoxygenated gel electrolyte includes the step of adding a gelling agent to a deoxygenated electrolyte solution, said gelling agent selected from the group of materials consisting of gelatin, agar, bacto-agar, cetyltriammonium tosylate, polyacrylamide, and carboxylmethyl cellulose.

16. The method of claim 13, wherein the step of providing said deoxygenated gel electrolyte includes the step of including an oxygen getter in said deoxygenated gel electrolyte.

17. The method of claim 16, wherein the step of including said oxygen getter in said deoxygenated gel electrolyte comprises adding ascorbic acid or ascorbate ion to said deoxygenated gel electrolyte.

18. The method of claim 13, wherein the step of connecting said cathode to said solderable metal connector further comprises embedding a brush of electrically conductive material in said deoxygenated gel electrolyte, connecting said cathode to said brush, and placing said solderable metal connector in said gel electrolyte and in contact with said brush.

19. The method of claim 18, wherein the step of embedding said brush in said deoxygenated gel electrolyte further comprises selecting said brush from the forms consisting of a mesh, wool, particle bed, and web of pre-reduced contact leads.

20. The method of claim 13, further comprising the step of reforming said deoxygenated gel electrolyte after analyzing said solderable metal connector by heating then cooling said deoxygenated gel electrolyte.

* * * * *